US012779984B2

(12) United States Patent
Kurahara

(10) Patent No.: US 12,779,984 B2
(45) Date of Patent: Nov. 3, 2026

(54) WORK VEHICLE

(71) Applicant: Kubota Corporation, Osaka (JP)

(72) Inventor: Hiroki Kurahara, Sakai (JP)

(73) Assignee: Kubota Corporation, Osaka (JP)

( * ) Notice: Subject to any disclaimer, the term of this patent is extended or adjusted under 35 U.S.C. 154(b) by 210 days.

(21) Appl. No.: 18/888,233

(22) Filed: Sep. 18, 2024

(65) Prior Publication Data

US 2025/0115116 A1 Apr. 10, 2025

(30) Foreign Application Priority Data

Oct. 6, 2023 (JP) ................................ 2023-174139

(51) Int. Cl.
*B60K 13/04* (2006.01)
*F01N 13/18* (2010.01)

(52) U.S. Cl.
CPC .......... *B60K 13/04* (2013.01); *F01N 13/1822* (2013.01); *F01N 13/1844* (2013.01)

(58) Field of Classification Search
CPC . B60K 13/04; F01N 13/1822; F01N 13/1844; F01N 1/00; F01N 2590/08
See application file for complete search history.

(56) References Cited

U.S. PATENT DOCUMENTS

| | | | | |
|---|---|---|---|---|
| 6,095,460 A * | 8/2000 | Mercer | ............... | F01N 13/1822 248/608 |
| 11,560,825 B2 | 1/2023 | Diehl et al. | | |
| 2004/0069562 A1 | 4/2004 | Kondo et al. | | |
| 2014/0196973 A1 | 7/2014 | Sellars | | |
| 2019/0276103 A1 | 9/2019 | Ono et al. | | |

FOREIGN PATENT DOCUMENTS

JP 2019155998 A 9/2019

* cited by examiner

*Primary Examiner* — Timothy Hannon
(74) *Attorney, Agent, or Firm* — The Webb Law Firm

(57) ABSTRACT

A work vehicle includes a first anti-vibration mount and a second anti-vibration mount with which a muffler is attached to an attachment target while being oriented with its longitudinal direction extending along a horizontal plane. The first anti-vibration mount is located on a portion on one side of the muffler in the longitudinal direction and on a portion on one side of the muffler in an up-down direction. The second anti-vibration mount is located on a portion on the other side of the muffler in the longitudinal direction and on a portion on the other side of the muffler in the up-down direction.

12 Claims, 6 Drawing Sheets

WORK VEHICLE

CROSS-REFERENCE TO RELATED APPLICATION

This application claims priority to Japanese Patent Application No. 2023-174139 filed Oct. 6, 2023, the disclosure of which is hereby incorporated by reference in its entirety.

BACKGROUND OF THE INVENTION

1. Field of the Invention

The present invention relates to a muffler attachment structure of a work vehicle with an engine.

2. Description of Related Art

Among utility work vehicles exemplifying work vehicles with engines, there is a type of utility work vehicle in which, as disclosed in JP 2019-155998A, a muffler to which an exhaust pipe from the engine is connected is attached to a frame (corresponding to an attachment target) included in a body frame.

JP 2019-155998A is an example of related art.

SUMMARY OF THE INVENTION

In order to prevent damage to the mufflers of work vehicles, it has been proposed to attach the muffler to the attachment target via an anti-vibration mount.

An object of the present invention is to provide a configuration for a work vehicle where a muffler is attached to an attachment target via an anti-vibration mount, the configuration allowing the muffler to be properly attached to the attachment target with a small number of anti-vibration mounts.

A work vehicle of the present invention includes an engine, an exhaust pipe extending from the engine, and a first anti-vibration mount and a second anti-vibration mount with which the muffler is attached to an attachment target while the muffler is oriented with a longitudinal direction of the muffler extending along a horizontal plane, wherein the first anti-vibration mount is located on a portion of the muffler on one side of the muffler in the longitudinal direction and on a portion of the muffler on one side of the muffler in an up-down direction, and the second anti-vibration mount is located on a portion of the muffler on another side of the muffler in the longitudinal direction and on a portion of the muffler on another side of the muffler in the up-down direction.

According to the present invention, the muffler is attached to the attachment target with the first anti-vibration mount and the second anti-vibration mount while the muffler is oriented with its longitudinal direction extending along a horizontal plane (for example, while the muffler is oriented with its longitudinal direction extending along a front-rear direction or a left right direction).

For example, if the longitudinal direction of the muffler extends along the front-rear direction, the first anti-vibration mount is located on a lower front portion of the muffler, and the second anti-vibration mount is located on an upper rear portion of the muffler.

Alternatively, the first anti-vibration mount is located on an upper front portion of the muffler, and the second anti-vibration mount is located on a lower rear portion of the muffler.

Alternatively, the first anti-vibration mount is located on the lower rear portion of the muffler, and the second anti-vibration mount is located on the upper front portion of the muffler.

Alternatively, the first anti-vibration mount is located on the upper rear portion of the muffler, and the second anti-vibration mount is located on the lower rear portion of the muffler.

According to the present invention, when viewed in a direction along a horizontal plane and orthogonal to the longitudinal direction of the muffler, the first and second anti-vibration mounts are positioned on a diagonal line of the muffler, away from each other.

Thus, when the muffler is attached to the attachment target with the first and second anti-vibration mounts, vibrations transmitted to the muffler from the attachment target are appropriately absorbed, even if the muffler is attached with a small number of first and second anti-vibration mounts, and damage to the muffler caused by vibrations can be prevented.

In the present invention, it is preferable that the exhaust pipe is connected to the portion of the muffler on the one side of the muffler in the longitudinal direction and to the portion of the muffler on the one side of the muffler in the up-down direction.

According to the present invention, the exhaust pipe is connected to a portion of the muffler near the first anti-vibration mount.

This allows vibrations transmitted to the muffler from the exhaust pipe to be appropriately absorbed by the first anti-vibration mount and is therefore advantageous for preventing damage to the muffler caused by vibrations.

In the present invention, it is preferable that, when viewed in the longitudinal direction of the muffler, a connecting portion between the exhaust pipe and the muffler, the first anti-vibration mount, and the second anti-vibration mount are located at three positions, with one at each of the three positions, the three positions being a position of an imaginary vertical line passing through a center of the muffler when viewed in the longitudinal direction of the muffler, and positions on one side and another side, respectively, relative to the vertical line, in a direction extending along a horizontal plane.

According to the present invention, when viewed in the longitudinal direction of the muffler, the three components, that is, the connecting portion between the exhaust pipe and the muffler, the first anti-vibration mount, and the second anti-vibration mount are respectively located at the position of the vertical line and the positions on the one side and the other side relative to the vertical line in the direction extending along a horizontal plane, with one component assigned to each of these three positions.

This is advantageous for preventing damage to the muffler caused by vibrations, because the three components, that is, the connecting portion between the exhaust pipe and the muffler, the first anti-vibration mount, and the second anti-vibration mount are located at dispersed positions when viewed in the longitudinal direction of the muffler, and vibrations transmitted to the muffler from the exhaust pipe are appropriately absorbed by the first anti-vibration mount.

In the present invention, it is preferable that the exhaust pipe is connected to the portion of the muffler on the one side of the muffler in the longitudinal direction and to the portion of the muffler on the one side of the muffler in the up-down direction; when viewed in the longitudinal direction of the muffler, the connecting portion between the exhaust pipe and the muffler is located on the one side relative to the vertical line in the direction extending along a horizontal plane; when viewed in the longitudinal direction of the muffler, the first anti-vibration mount is located at the position of the vertical line; and when viewed in the longitudinal direction of the muffler, the second anti-vibration mount is located on the other side relative to the vertical line in the direction extending along a horizontal plane.

According to the present invention, the exhaust pipe is connected to a portion of the muffler near the first anti-vibration mount.

This allows vibrations transmitted to the muffler from the exhaust pipe to be appropriately absorbed by the first anti-vibration mount and is therefore advantageous in preventing damage to the muffler caused by vibrations.

According to the present invention, in the above-described state, when viewed in the longitudinal direction of the muffler, the connecting portion between the exhaust pipe and the muffler is located on the one side relative to the vertical line in the direction extending along a horizontal plane, and the first anti-vibration mount is located at the position of the vertical line.

This is advantageous for preventing damage to the muffler caused by vibrations, because the connecting portion between the exhaust pipe and the muffler and the first anti-vibration mount are located closer to each other than when the connecting portion between the exhaust pipe and the muffler and the first anti-vibration mount are located on the one side and the other side, respectively, relative to the vertical line in the horizontal direction.

In the present invention, it is preferable that the muffler is positioned laterally to the attachment target while the muffler is oriented with the longitudinal direction of the muffler extending along the attachment target; when viewed in the longitudinal direction of the muffler, the connecting portion between the exhaust pipe and the muffler is located on a side that is far from the attachment target, relative to the vertical line, in the direction extending along a horizontal plane; when viewed in the longitudinal direction of the muffler, one of the first anti-vibration mount and the second anti-vibration mount is located at the position of the vertical line; and when viewed in the longitudinal direction of the muffler, the other one of the first anti-vibration mount and the second anti-vibration mount is located on a side that is near the attachment target, relative to the vertical line, in the direction extending along a horizontal plane.

In work vehicles, the muffler may be positioned laterally to the attachment target while the muffler is oriented with the longitudinal direction of the muffler extending along the attachment target.

According to the present invention, when viewed in the longitudinal direction of the muffler, the connecting portion between the exhaust pipe and the muffler is located on the side that is far from the attachment target, relative to the vertical line, in the direction extending along a horizontal plane, and this ensures that the exhaust pipe is easily positioned away from the attachment target.

Consequently, this reduces the likelihood of the exhaust pipe and the attachment target coming into contact due to vibrations and the like, and is therefore advantageous for preventing damage to the muffler caused by vibrations.

According to the present invention, when viewed in the longitudinal direction of the muffler, the first anti-vibration mount and the second anti-vibration mount are located at the position of the vertical line and the position on the side that is near the attachment target, relative to the vertical line, in the direction extending along a horizontal plane, and this ensures that the first and second anti-vibration mounts are easily positioned close to the attachment target.

Consequently, this allows the first and second anti-vibration mounts to be easily configured compactly, which is advantageous for structural simplification.

In the present invention, it is preferable that the work vehicle includes a spherical joint connecting the exhaust pipe and the muffler to each other.

In work vehicles, the position of the exhaust pipe may be changed according to changes in engine specifications, model changes, or the like.

According to the present invention, the exhaust pipe and the muffler are connected to each other via the spherical joint, so that even when the position of the exhaust pipe is changed as described above, this change in the position of the exhaust pipe is accommodated by the spherical joint.

Consequently, even when the position of the exhaust pipe is changed due to a change in engine specifications, a model change, or the like, there is no need to change the muffler according to the change in engine specifications, the model change, or the like, and this allows a muffler to be used for engines with various specifications or of various types, which is advantageous for reducing the number of components.

In the present invention, it is preferable that the first anti-vibration mount and the second anti-vibration mount each include an anti-vibration rubber that is located on one of the muffler and the attachment target and has an opening, a base located on the other one of the muffler and the attachment target, and a support member located on the base, and the opening of the anti-vibration rubber and the support member are oriented in an identical direction, and the support member is in the opening of the anti-vibration rubber.

According to the present invention, the first and second anti-vibration mounts include the anti-vibration rubbers having the respective openings, and the bases on which the respective support members are located, and the muffler is supported by the first and second anti-vibration mounts as a result of the support members being inserted into the openings of the anti-vibration rubbers.

In this case, in the first and second anti-vibration mounts, the openings of the anti-vibration rubbers and the support members are oriented in the identical direction, and this allows the muffler and the first and second anti-vibration mounts to be assembled in the same manner and therefore can improve the assemblability of the muffler and the first and second anti-vibration mounts.

According to the present invention, when the muffler is supported by the first and second anti-vibration mounts as a result of the support members being inserted into the openings of the anti-vibration rubbers, the support members are movable along the openings of the anti-vibration rubbers (or the anti-vibration rubbers are movable along the support members).

Consequently, even if stress due to an assembly error or the like begins to occur during the assembly of the muffler and the first and second anti-vibration mounts, the stress is released as the support members move along the openings of the anti-vibration rubbers (or as the anti-vibration rubbers move along the support members). Since stress due to an assembly error or the like is released, residual stress is unlikely to occur, and therefore, damage to the muffler or the like caused by residual stress can be prevented.

According to the present invention, when the position of the exhaust pipe is changed due to a change in engine specifications, a model change, or the like, if this position change is along the direction of the openings of the anti-vibration rubbers and the support members, the position change is accommodated by the support members moving along the openings of the anti-vibration rubbers (or by the anti-vibration rubbers moving along the support members).

This eliminates the need to change the muffler according to a change in engine specifications, a model change, or the like, and therefore allows a muffler to be used for engines with various specifications or of various types, which is advantageous for structural simplification.

In the present invention, it is preferable that the opening of the anti-vibration rubber and the support member are oriented in the longitudinal direction of the muffler.

According to the present invention, in the first and second anti-vibration mounts, the openings of the anti-vibration rubbers and the support members are oriented in the longitudinal direction of the muffler. This is advantageous for improving the assemblability of the first and second anti-vibration mounts.

In the present invention, it is preferable that the anti-vibration rubber is located on the attachment target, and the base is located on the muffler.

According to the present invention, the anti-vibration rubber is easily positioned farther away from the muffler than the base and the support member. This can suppress the transfer of heat from the muffler to the anti-vibration rubber, thereby improving the durability of the anti-vibration rubber.

In the present invention, it is preferable that the support member of the first anti-vibration mount and the support member of the second anti-vibration mount extend in opposite directions to each other from the respective bases, and when the support members are in the openings of the anti-vibration rubbers, the base of the first anti-vibration mount and the base of the second anti-vibration mount are positioned on opposite sides relative to the anti-vibration rubbers.

According to the present invention, when the muffler moves in one direction or the opposite direction along the openings of the anti-vibration rubbers and the support members, the movement of the muffler is stopped by the anti-vibration rubber and the base abutting each other in the first anti-vibration mount (or in the second anti-vibration mount).

This ensures that, if the support members are movable along the openings of the anti-vibration rubbers (or if the anti-vibration rubbers are movable along the support members), the muffler does not move more than necessary. In this case, the need for a dedicated stopper that stops the movement of the muffler is eliminated by effectively using the configuration of the first and second anti-vibration mounts, which is advantageous for structural simplification.

In the present invention, it is preferable that the base has a pair of leg portions attached to the other one of the muffler and the attachment target, and a recess located between respective ends, opposite to the other one of the muffler and the attachment target, of the pair of leg portions and bent toward the other one of the muffler and the attachment target, and the support member is attached to the recess.

According to the present invention, since the base has a bent shape due to having the pair of leg portions and the recess, the strength of the base can be increased. Since the support member is attached to the recess of the base in such a manner as to be inserted into the recess, the support member can be smoothly attached to the base, and the support member serves as a reinforcing member for the base. Accordingly, the overall strength of the base and the support member can be increased.

According to the present invention, the pair of leg portions of the base are attached to the other one of the muffler and the attachment target, and the contact area between the base and the other one of the muffler and the attachment target is small.

This can suppress the transfer of heat from the other one of the muffler and the attachment target to the base and the support member, and from the support member to the anti-vibration rubber, thereby improving the durability of the anti-vibration rubber.

In the present invention, it is preferable that the leg portions each have an opening.

According to the present invention, since the leg portions of the base have the openings, a weight reduction of the base can be achieved.

According to the present invention, since the leg portions of the base have the openings, heat transfer paths in the leg portions of the base that transfer heat from the other one of the muffler and the attachment target are narrowed, which is advantageous for suppressing the transfer of heat from the base and the support member to the anti-vibration rubber and hence for improving the durability of the anti-vibration rubber.

When the heat transfer paths in the leg portions of the base are narrowed by the leg portions of the base having openings, if the base is made of, for example, stainless steel (SUS), which has low thermal conductivity, it is more advantageous for suppressing the transfer of heat from the base and the support member to the anti-vibration rubber.

In the present invention, it is preferable that the work vehicle includes a bracket attached to the one of the muffler and the attachment target; and an attachment member configured to press the anti-vibration rubber against the bracket to attach the anti-vibration rubber to the bracket, wherein the attachment member has an engagement portion located at one end of the attachment member and configured to engage with the bracket, and a joining portion located at another end of the attachment member and configured to be joined to the bracket with a bolt.

According to the present invention, when the anti-vibration rubber is located on one of the muffler and the attachment target, the work vehicle includes the bracket attached to the one of the muffler and the attachment target, and the attachment member configured to press the anti-vibration rubber against the bracket to attach the anti-vibration rubber to the bracket.

In the above configuration, according to the present invention, as a result of the engagement portion of the attachment member being engaged with the bracket and the joining portion of the attachment member being bolted to the bracket, the attachment member is joined to the bracket, and the anti-vibration rubber is attached to the bracket by the attachment member.

This reduces the number of bolts joining the attachment member to the bracket, and can therefore simplify the structure for joining the attachment member to the bracket.

In the present invention, it is preferable that the bracket has an opening, a pair of protrusions are located at one end and another end of the opening of the bracket and protrude toward a center of the opening of the bracket, and the anti-vibration rubber rests on the protrusions and is attached to the bracket by being pressed against the bracket by the attachment member.

According to the present invention, since the anti-vibration rubber is attached to the bracket while resting on the pair of protrusions of the opening of the bracket, the contact area between the anti-vibration rubber and the bracket can be reduced.

The reduction in the contact area between the anti-vibration rubber and the bracket is advantageous for suppressing the transfer of heat from one of the muffler and the attachment target to the anti-vibration rubber and hence for improving the durability of the anti-vibration rubber.

In the present invention, it is preferable that the attachment member has a pair of the engagement portions, one of the engagement portions is configured to engage with one of laterally adjacent portions of one of the protrusions of the opening of the bracket, and the other one of the engagement portions is configured to engage with the other one of the laterally adjacent portions of the protrusion of the opening of the bracket.

According to the present invention, when the attachment member has the pair of engagement portions, one of the protrusions of the opening of the bracket is located between the pair of engagement portions of the attachment member.

Thus, when the anti-vibration rubber rests on the pair of protrusions of the opening of the bracket, the anti-vibration rubber is pressed against the bracket and attached to the bracket by the attachment member in a well-balanced manner.

BRIEF DESCRIPTION OF THE DRAWINGS

The terms FIG., FIGS., Figure, and Figures are used interchangeably in the specification to refer to the corresponding figures in the drawings.

DESCRIPTION OF THE INVENTION

FIGS. 1 to 6 show a utility work vehicle. In FIGS. 1 to 6, F indicates a forward direction, B indicates a rearward direction, U indicates an upward direction, D indicates a downward direction, R indicates a rightward direction, and L indicates a leftward direction.

Overall Configuration of Work Vehicle

Figure 1:
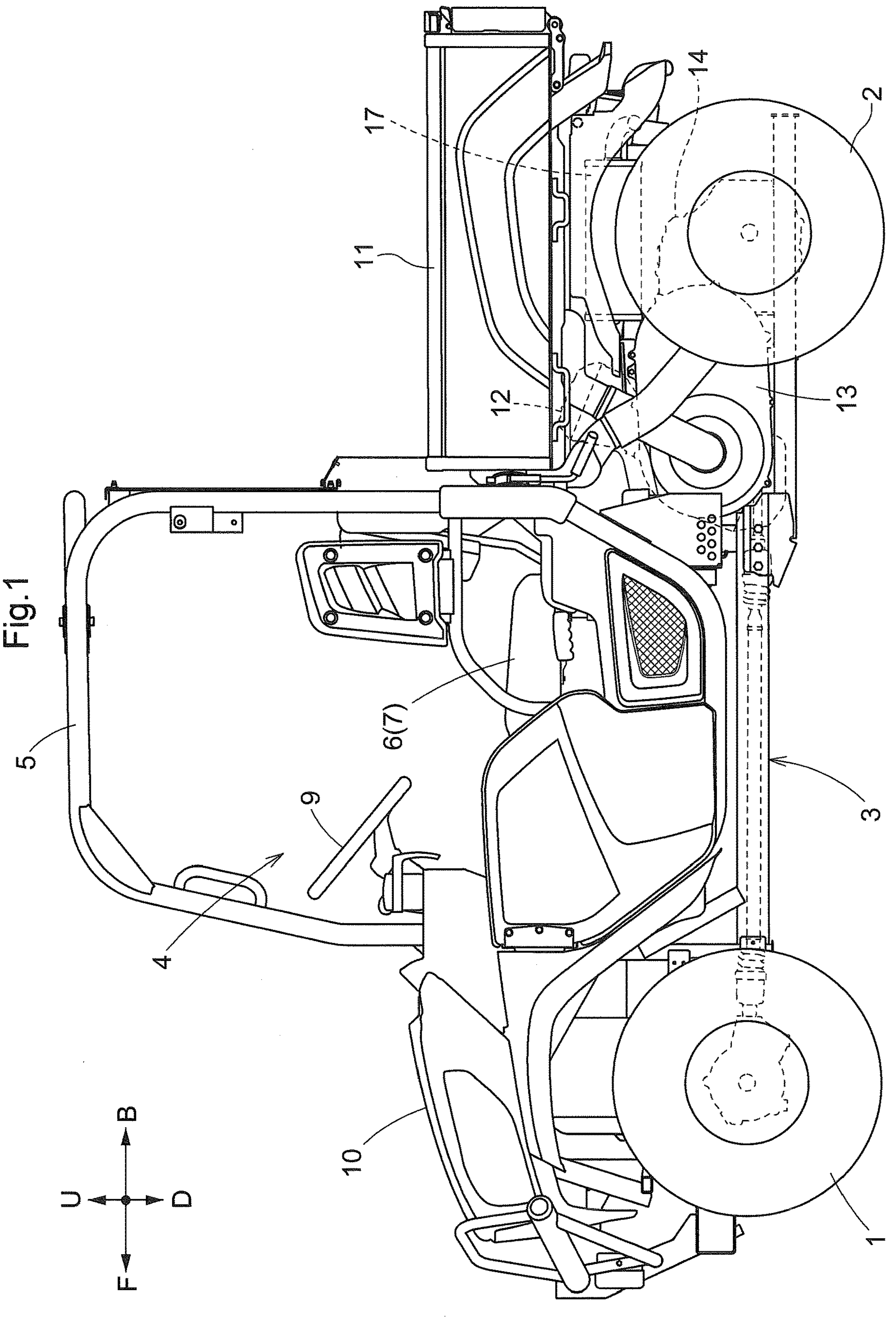
FIG. 1 is a left side view of a work vehicle.
Figure 2:
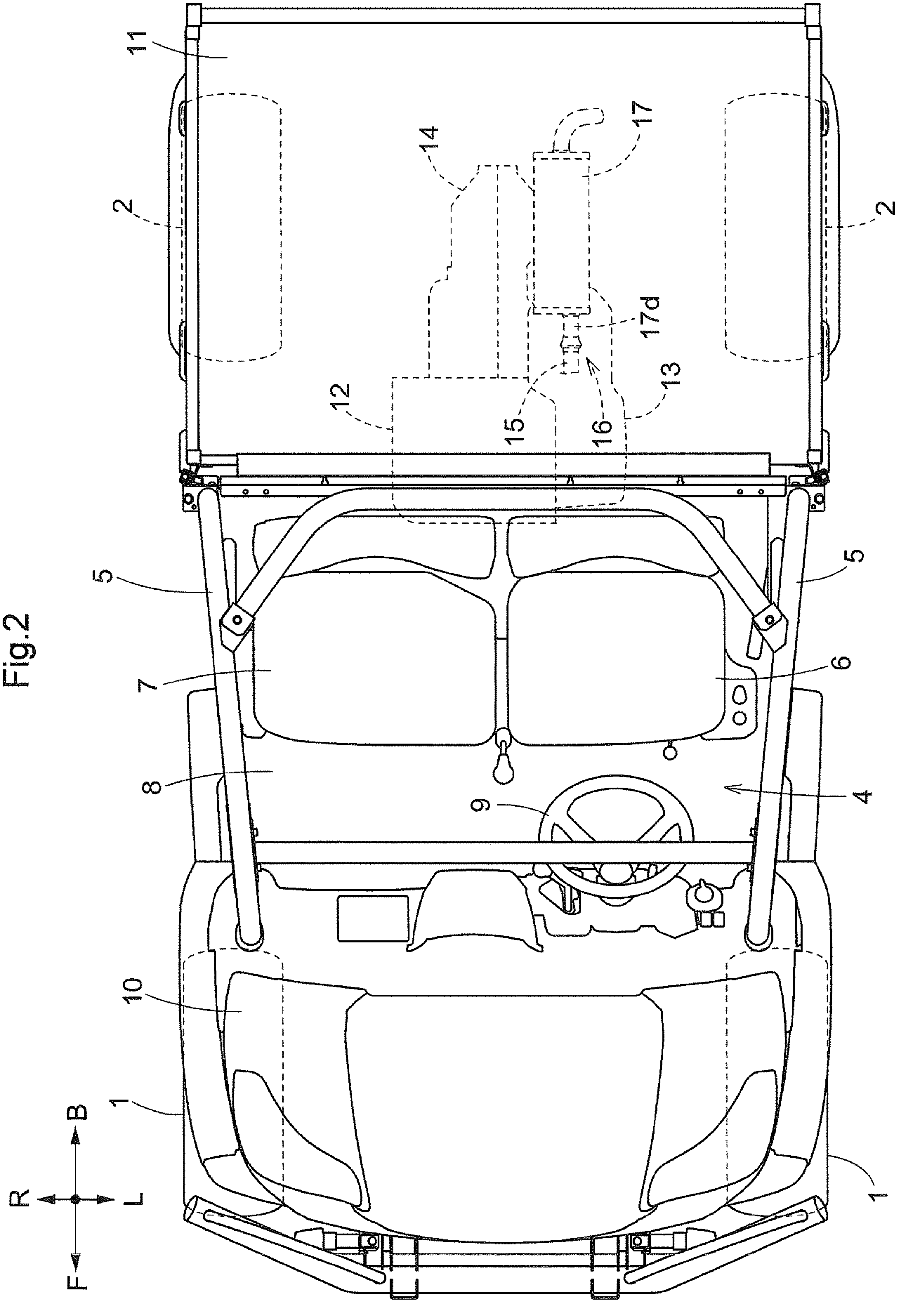
FIG. 2 is a plan view of the work vehicle.

As shown in FIGS. 1 and 2, right and left front wheels 1 are located at the front, and right and left rear wheels 2 are located at the rear of a body 3 of the work vehicle. A cab section 4 for a driver and an operator to sit is located at a portion of the body 3 between the front wheels 1 and the rear wheels 2, and is surrounded by a roll-over protective structure (ROPS) frame 5. The cab section 4 includes a driver seat 6, a passenger seat 7, a floor 8, a steering wheel 9 for steering the front wheels 1, and so on.

A hood 10 is located forward of the cab section 4, and a cargo bed 11 is located rearward of the cab section 4. The cargo bed 11 can be raised and lowered between a use position indicated by solid lines in FIG. 1 and a dump position in which a front portion of the cargo bed 11 is raised with a lower rear portion of the cargo bed 11 as a support point.

An engine 12, a continuously variable transmission 13, and a transmission case 14 (corresponding to an attachment target) are located in a rear part of the body 3. The continuously variable transmission 13 is of a belt-driven type. The transmission case 14 contains an auxiliary transmission (not shown) having three forward gears and one reverse gear, and a rear-wheel differential device (not shown).

Motive power of the engine 12 is subjected to speed change by the continuously variable transmission 13, transferred to the auxiliary transmission in the transmission case 14 and subjected to speed change by the auxiliary transmission, and transferred from the rear wheel differential device to the rear wheels 2. Motive power diverted from between the auxiliary transmission and the rear-wheel differential device is transferred to the front wheels 1 via transmission shafts (not shown).

Configuration Related to Exhaust from Engine

As shown in FIGS. 1 and 2, the engine 12 is of a transversely mounted type with a crankshaft (not shown) oriented in a left-right direction. The engine 12, the continuously variable transmission 13, and the transmission case 14 are arranged along a front-rear direction in a plan view.

An exhaust pipe 15 extends forward and leftward from an exhaust manifold at a front portion of the engine 12 and then extends rearward. A muffler 17 is located to the left of the transmission case 14 and extends along a left lateral surface of the transmission case 14. A longitudinal direction A1 (see FIG. 3) of the muffler 17 extends along the front-rear direction and the left lateral surface of the transmission case 14.

Figure 3:
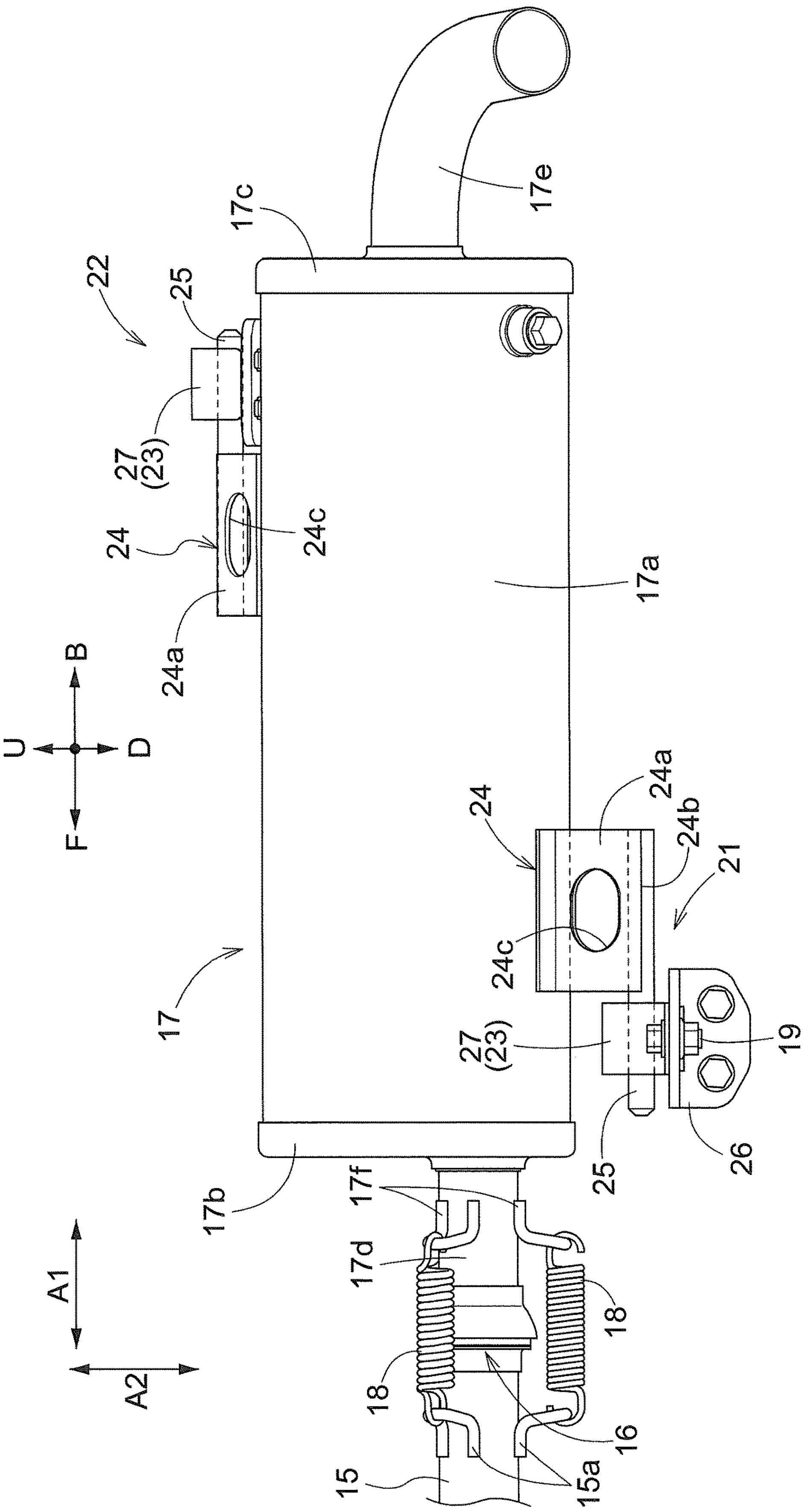
FIG. 3 is a left side view of an area surrounding and encompassing a muffler, a first anti-vibration mount, and a second anti-vibration mount.
Figure 4:
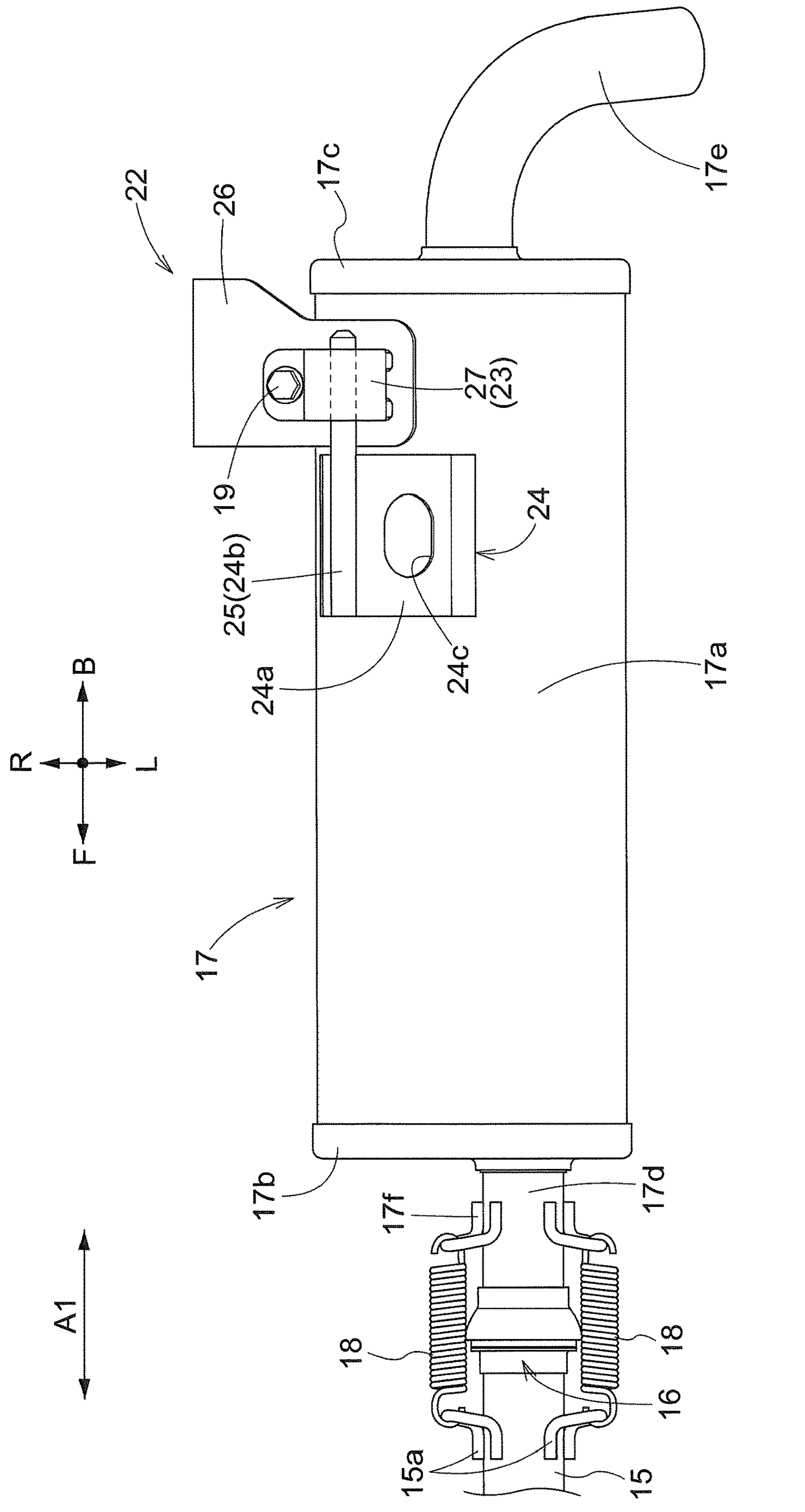
FIG. 4 is a plan view of the area surrounding and encompassing the muffler, the first anti-vibration mount, and the second anti-vibration mount.
Figure 5:
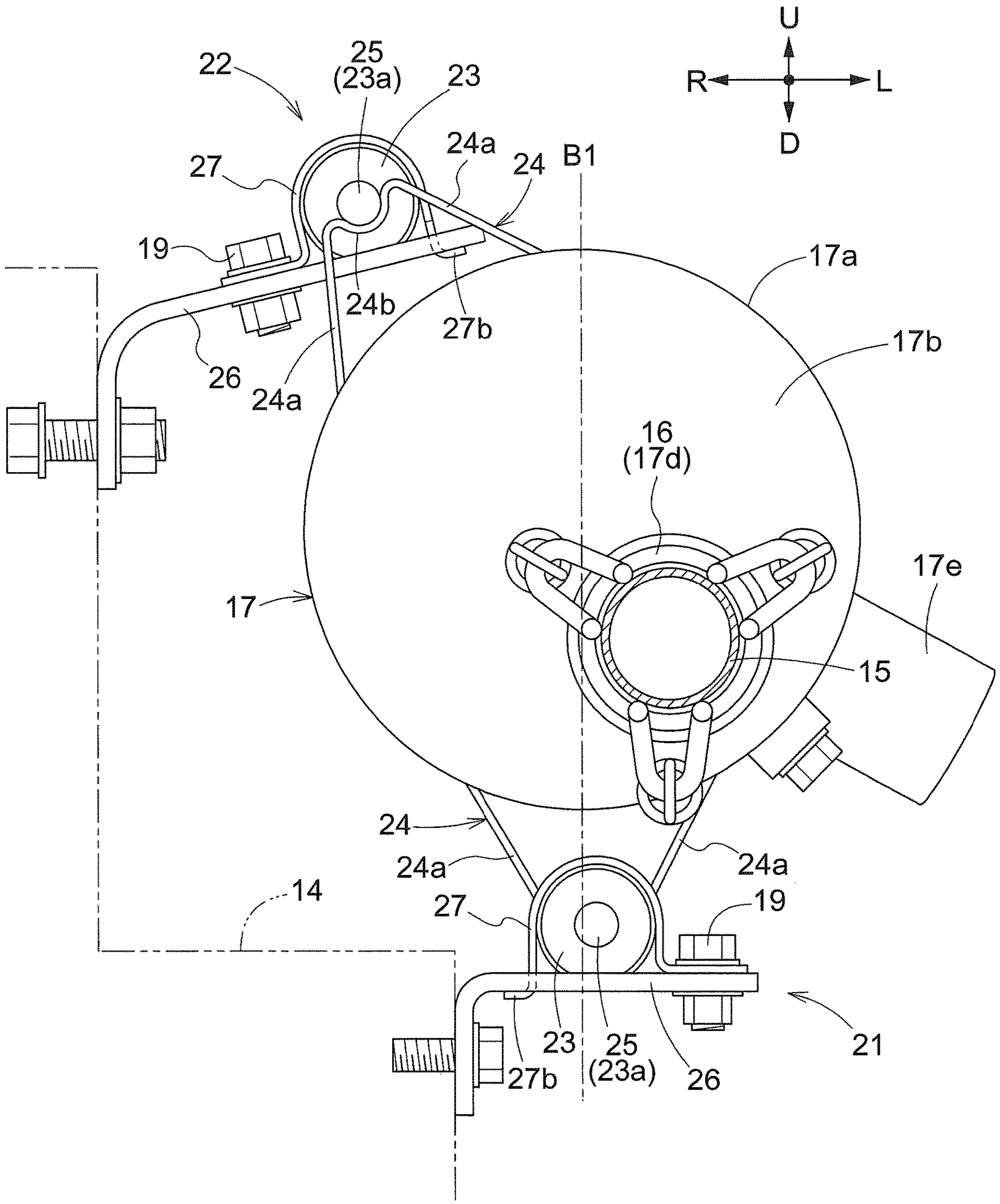
FIG. 5 is a front view of the area surrounding and encompassing the muffler, the first anti-vibration mount, and the second anti-vibration mount.

As shown in FIGS. 3, 4, and 5, the muffler 17 has a cylindrical main body 17*a* and disc-shaped front and rear face sections 17*b* and 17*c*, with an inlet pipe 17*d* on the front face section 17*b* and an outlet pipe 17*e* on the rear face section 17*c*.

The inlet pipe 17*d* of the muffler 17 is connected to the exhaust pipe 15 via a spherical joint 16. The outlet pipe 17*e* of the muffler 17 extends leftward from the rear face section 17*c* of the muffler 17. Thus, exhaust from the engine 12 is discharged through the exhaust pipe 15, the spherical joint 16, and the muffler 17 and then emitted from the outlet pipe 17*e* of the muffler 17.

In the spherical joint 16, a plurality of attachment portions 15*a* are located on the exhaust pipe 15, a plurality of attachment portions 17*f* are located on the inlet pipe 17*d* of the muffler 17, and springs 18 are attached between the attachment portions 15*a* of the exhaust pipe 15 and the corresponding attachment portions 17*f* of the muffler 17.

The biasing force of the springs 18 presses a portion of the exhaust pipe 15 located within the spherical joint 16 and a portion of the inlet pipe 17*d* of the muffler 17 located within the spherical joint 16 against each other and prevents them from separating. Even if the muffler 17 is inclined in an up-down direction A2 or the left-right direction relative to the exhaust pipe 15 (or even if the exhaust pipe 15 is inclined in the up-down direction A2 or the left-right direction relative to the muffler 17), this inclination is accommodated by the spherical joint 16 and the expansion and contraction of the springs 18.

Claim Correspondence of Muffler

Based on the above configuration, the work vehicle includes the engine 12, the exhaust pipe 15 extending from the engine 12, and the muffler 17 to which the exhaust pipe 15 is connected. The work vehicle includes the spherical joint 16 connecting the exhaust pipe 15 and the muffler 17 to each other.

The muffler 17 is positioned laterally to the attachment target (transmission case 14) while being oriented with its longitudinal direction A1 extending along the attachment target (transmission case 14).

Arrangement of First and Second Anti-Vibration Mounts

As shown in FIGS. 3, 4, and 5, the muffler 17 is attached to the transmission case 14 via a first anti-vibration mount 21 and a second anti-vibration mount 22.

The first anti-vibration mount 21 is located on a front portion of the main body 17*a* of the muffler 17 (corresponding to a portion on one side of the muffler 17 in the longitudinal direction A1) and on a lower portion of the main body 17*a* of the muffler 17 (corresponding to a portion on one side of the muffler 17 in the up-down direction A2). In this case, the longitudinal direction A1 of the muffler 17 extends along the front-rear direction (a direction extending along a horizontal plane).

The second anti-vibration mount 22 is located on a rear portion of the main body 17*a* of the muffler 17 (corresponding to a portion on another side of the muffler 17 in the longitudinal direction A1) and on an upper portion of the main body 17*a* of the muffler 17 (corresponding to a portion on another side of the muffler 17 in the up-down direction A2).

As shown in FIG. 5, when viewed in the longitudinal direction A1 of the muffler 17, the inlet pipe 17*d* of the muffler 17 (the spherical joint 16 and the exhaust pipe 15) is located on a lower portion (corresponding to the portion on the one side of the muffler 17 in the up-down direction A2) of the front face section 17*b* (corresponding to the portion on the one side of the muffler 17 in the longitudinal direction A1) of the muffler 17.

When an imaginary vertical line B1 passing through the center of the muffler 17, when viewed in the longitudinal direction A1 of the muffler 17, is assumed, the inlet pipe 17*d* (corresponding to a connecting portion between the exhaust pipe 15 and the muffler 17) of the muffler 17 is located to the left (corresponding to one side in a direction extending along a horizontal plane and to a side that is far from the attachment target) of the vertical line B1.

When viewed in the longitudinal direction A1 of the muffler 17, the first anti-vibration mount 21 is located at the position of the vertical line B1. When viewed in the longitudinal direction A1 of the muffler 17, the second anti-vibration mount 22 is located to the right (corresponding to another side in the direction extending along a horizontal plane and to a side that is near the attachment target) of the vertical line B1.

Claim Correspondence of Arrangement of First and Second Anti-Vibration Mounts—1

Based on the above configuration, the work vehicle includes the first anti-vibration mount 21 and the second anti-vibration mount 22 with which the muffler 17 is attached to the attachment target (transmission case 14) while the muffler 17 is oriented with its longitudinal direction A1 extending along a horizontal plane.

The first anti-vibration mount 21 is located on the portion of the muffler 17 on the one side of the muffler 17 in the longitudinal direction A1 and on the portion of the muffler 17 on the one side of the muffler 17 in the up-down direction A2.

The second anti-vibration mount 22 is located on the portion of the muffler 17 on the other side of the muffler 17 in the longitudinal direction A1 and on the portion of the muffler 17 on the other side of the muffler 17 in the up-down direction A2.

The exhaust pipe 15 is connected to the portion of the muffler 17 on the one side of the muffler 17 in the longitudinal direction A1 and to the portion of the muffler 17 on the one side of the muffler 17 in the up-down direction A2.

Claim correspondence of arrangement of first and second anti-vibration mounts—2

Based on the above configuration, when viewed in the longitudinal direction A1 of the muffler 17, the connecting portion between the exhaust pipe 15 and the muffler 17, the first anti-vibration mount 21, and the second anti-vibration mount 22 are located at the following three positions, with one of these three components at each of the three positions: the position of the imaginary vertical line B1 passing through the center of the muffler 17 when viewed in the longitudinal direction A1 of the muffler 17, and the positions on the one side and the other side, respectively, relative to the vertical line B1, in the direction extending along a horizontal plane.

When viewed in the longitudinal direction A1 of the muffler 17, the connecting portion between the exhaust pipe 15 and the muffler 17 is located on the one side relative to the vertical line B1 in the direction extending along a horizontal plane.

When viewed in the longitudinal direction A1 of the muffler 17, the first anti-vibration mount 21 is located at the position of the vertical line B1.

When viewed in the longitudinal direction A1 of the muffler 17, the second anti-vibration mount 22 is located on the other side relative to the vertical line B1 in the direction extending along a horizontal plane.

When viewed in the longitudinal direction A1 of the muffler 17, the connecting portion between the exhaust pipe 15 and the muffler 17 is located on the side that is far from the attachment target (transmission case 14), relative to the vertical line B1, in the direction extending along a horizontal plane.

When viewed in the longitudinal direction A1 of the muffler 17, one of the first anti-vibration mount 21 and the second anti-vibration mount 22 is located at the position of the vertical line B1.

When viewed in the longitudinal direction A1 of the muffler 17, the other one of the first anti-vibration mount 21 and the second anti-vibration mount 22 is located on the side that is near the attachment target (transmission case 14), relative to the vertical line B1, in the direction extending along a horizontal plane.

Configuration of First and Second Anti-Vibration Mounts

Figure 6:
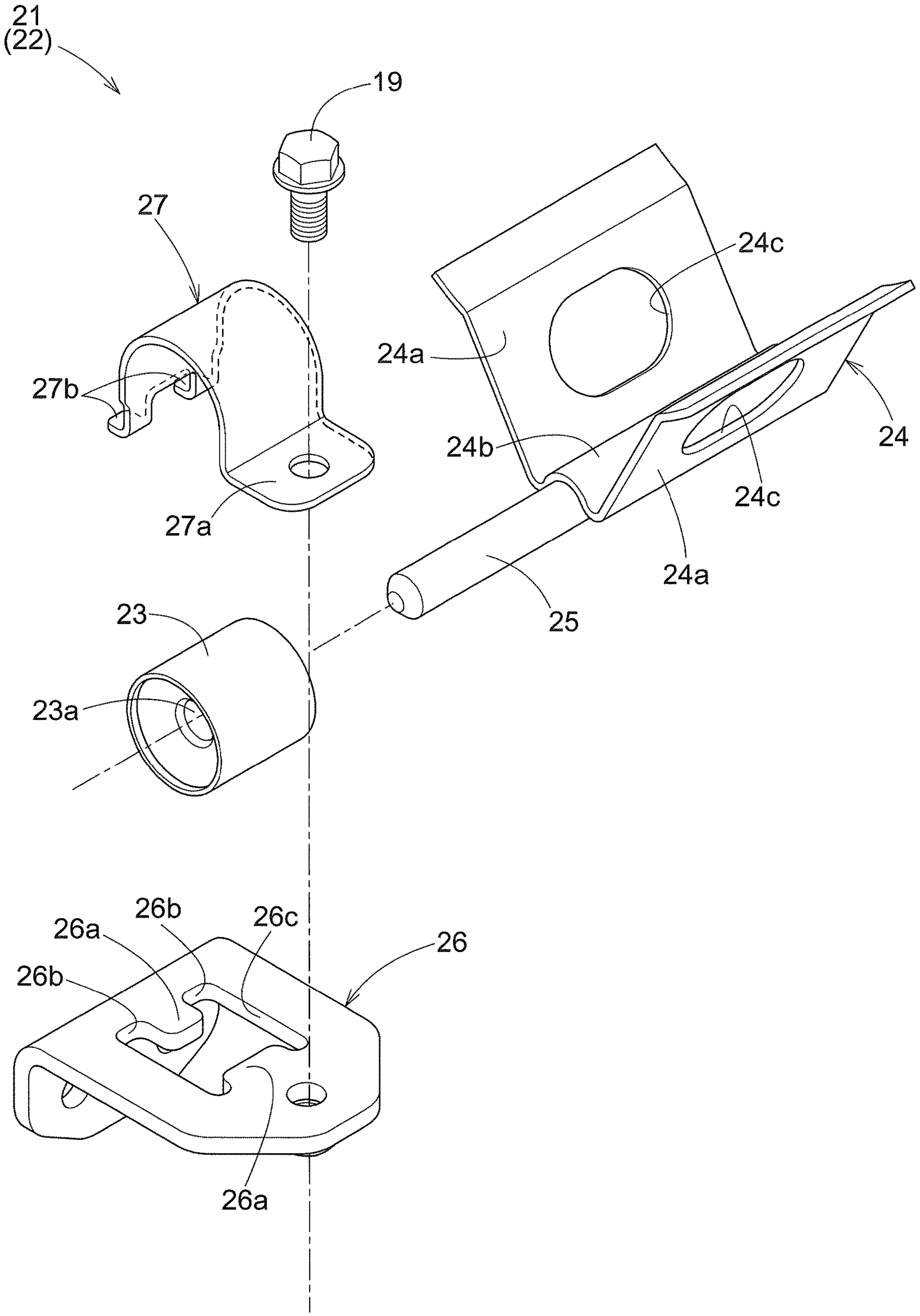
FIG. 6 is an exploded perspective view of the first anti-vibration mount and the second anti-vibration mount.

As shown in FIG. 6, the first anti-vibration mount 21 and the second anti-vibration mount 22 each have an anti-vibration rubber 23, a base 24, a support member 25, a bracket 26, and an attachment member 27.

The anti-vibration rubber 23 has a cylindrical shape with an opening 23*a* extending through its center portion. The attachment member 27 is formed from a plate material bent into a semicircular shape, with a pair of engagement portions 27*b* at one end and a joining portion 27*a* at the other end.

The bracket 26 is bolted to a left lateral side portion of the transmission case 14 (see FIG. 5). The bracket 26 has an H-shaped opening 26*c*, with protrusions 26*a* at one end and the other end, respectively, of the opening 26*c* of the bracket 26 in the left-right direction. The protrusions 26*a* face each other in such a manner as to protrude toward the center of the opening 26*c* of the bracket 26. In the opening 26*c* of the bracket 26, a pair of recesses 26*b* (corresponding to laterally adjacent portions) are located next to one of the protrusions 26*a* on both lateral sides thereof.

The base 24 is formed from a plate material bent into a W-shape and includes a pair of leg portions 24*a* and a recess 24*b* that is connected to and extends between respective ends of the pair of leg portions 24*a*. Each of the pair of leg portions 24*a* has an elongated opening 24*c*. The support member 25 is round rod-shaped and is placed in and attached to the recess 24*b* of the base 24.

As described later, an end, opposite to the recess 24*b*, of each leg portion 24*a* of the base 24 is attached to the muffler 17. Accordingly, the recess 24*b* of the base 24 is located between the respective ends, opposite to the muffler 17, of the pair of leg portions 24*a* of the base 24, and the support member 25 is located away from the muffler 17.

As shown in FIGS. 3 to 6, in the first anti-vibration mount 21, the leg portions 24*a* of the base 24 are attached to the front portion of the main body 17*a* of the muffler 17 and to the lower portion of the main body 17*a* of the muffler 17. The support member 25 extends from the base 24 toward the front face section 17*b* of the muffler 17 along the longitudinal direction A1 of the muffler 17.

In the second anti-vibration mount 22, the leg portions 24*a* of the base 24 are attached to the rear portion of the main body 17*a* of the muffler 17 and to the upper portion of the main body 17*a* of the muffler 17. The support member 25 extends from the base 24 toward the rear face section 17*c* of the muffler 17 along the longitudinal direction A1 of the muffler 17.

The anti-vibration rubber 23 is in the opening 26*c* of the bracket 26 and also rests on the pair of protrusions 26*a* of the bracket 26.

The engagement portions 27*b* of the attachment member 27 are inserted into and engaged with the recesses 26*b* of the bracket 26, and the joining portion 27*a* of the attachment member 27 is joined to the bracket 26 with a bolt 19. The anti-vibration rubber 23 is pressed against the protrusions 26*a* of the bracket 26 by the attachment member 27 and thereby attached to the bracket 26.

In the first anti-vibration mount 21, the support member 25 is inserted into the opening 23*a* of the anti-vibration rubber 23 from the rear of the anti-vibration rubber 23 and projects forward from the opening 23*a* of the anti-vibration rubber 23.

In the second anti-vibration mount 22, the support member 25 is inserted into the opening 23*a* of the anti-vibration rubber 23 from the front of the anti-vibration rubber 23 and projects rearward from the opening 23*a* of the anti-vibration rubber 23.

Assembled State of First and Second Anti-Vibration Mounts

As shown in FIGS. 3 to 6, when the operator attaches the muffler 17, the operator removes the anti-vibration rubber 23 and the attachment member 27 of the second anti-vibration mount 22 from the bracket 26 in advance.

In this state, the operator moves the muffler 17 forward from a position to the rear of the first anti-vibration mount 21 and, in the first anti-vibration mount 21, inserts the support member 25 into the opening 23*a* of the anti-vibration rubber 23 from the rear.

The operator brings the portion of the inlet pipe 17*d* of the muffler 17 that is located within the spherical joint 16 into contact with the portion of the exhaust pipe 15 that is located within the spherical joint 16 and attaches the springs 18 between the attachment portions 15*a* of the exhaust pipe 15 and the corresponding attachment portions 17*f* of the muffler 17.

Then, in the second anti-vibration mount 22, the operator inserts the support member 25 into the opening 23*a* of the anti-vibration rubber 23, fits the anti-vibration rubber 23 into the opening 26*c* of the bracket 26, and places the anti-vibration rubber 23 on the protrusions 26*a* of the bracket 26. The operator attaches the anti-vibration rubber 23 to the bracket 26 by attaching the attachment member 27 to the bracket 26.

As a result, in the first anti-vibration mount 21 and the second anti-vibration mount 22, the openings 23*a* of the anti-vibration rubbers 23 and the support members 25 are oriented in the same direction, that is, the longitudinal direction A1 (front-rear direction) of the muffler 17, and the support members 25 extend in opposite directions from the respective bases 24.

Claim Correspondence of Configuration of First and Second Anti-Vibration Mounts

Based on the above configuration, the first anti-vibration mount 21 and the second anti-vibration mount 22 each include the anti-vibration rubber 23 that is located on one of the muffler 17 and the attachment target (transmission case 14) and has the opening 23*a*, the base 24 located on the other one of the muffler 17 and the attachment target (transmission case 14), and the support member 25 located on the base 24.

The opening 23*a* of the anti-vibration rubber 23 and the support member 25 extend in the same direction, and the support member 25 is inserted into the opening 23*a* of the anti-vibration rubber 23. The opening 23*a* of the anti-vibration rubber 23 and the support member 25 extend in the longitudinal direction A1 of the muffler 17.

The anti-vibration rubber 23 is located on the attachment target (transmission case 14), and the base 24 is located on the muffler 17.

The support member 25 of the first anti-vibration mount 21 and the support member 25 of the second anti-vibration mount 22 extend in opposite directions to each other from the respective bases 24. When the support members 25 are inserted into the openings 23*a* of the anti-vibration rubbers 23, the base 24 of the first anti-vibration mount 21 and the base 24 of the second anti-vibration mount 22 are positioned on opposite sides relative to the anti-vibration rubbers 23.

The base 24 has the pair of leg portions 24*a* attached to the other one of the muffler 17 and the attachment target (transmission case 14), and the recess 24*b* located between the respective ends, opposite to the other one of the muffler 17 and the attachment target (transmission case 14), of the pair of leg portions 24*a* and bent toward the other one of the muffler 17 and the attachment target (transmission case 14).

The support member 25 is attached to the recess 24*b*.

The leg portions 24*a* have the openings 24*c*.

The work vehicle includes the bracket 26 attached to the one of the muffler 17 and the attachment target (transmission case 14), and the attachment member 27 configured to press the anti-vibration rubber 23 against the bracket 26 to attach the anti-vibration rubber 23 to the bracket 26.

The attachment member 27 has the engagement portions 27*b* located at one end of the attachment member 27 and configured to engage with the bracket 26 and the joining portion 27*a* located at the other end of the attachment member 27 and configured to be joined to the bracket 26 with the bolt 19.

The bracket 26 has the opening 26*c*.

The pair of protrusions 26*a* are located at one end and the other end, respectively, of the opening 26*c* of the bracket 26 and protrude toward the center of the opening 26*c* of the bracket 26.

The anti-vibration rubber 23 rests on the protrusions 26*a* and is attached to the bracket 26 by being pressed against the bracket 26 by the attachment member 27.

The attachment member 27 has the pair of engagement portions 27*b*.

One of the engagement portions 27*b* is configured to engage with one of the laterally adjacent portions (recesses 26*b*) of one of the protrusions 26*a* of the opening 26*c* of the bracket 26, and the other engagement portion 27*b* is configured to engage with the other laterally adjacent portion (recess 26*b*) of that protrusion 26*a* of the opening 26*c* of the bracket 26.

First Variation for Carrying Out the Invention

A configuration may be adopted in which the first anti-vibration mount 21 is located on the front portion of the main body 17*a* of the muffler 17 and on the upper portion of the main body 17*a* of the muffler 17, and the second anti-vibration mount 22 is located on the rear portion of the main body 17*a* of the muffler 17 and on the lower portion of the main body 17*a* of the muffler 17.

Second Variation for Carrying Out the Invention

A configuration may be adopted in which the first anti-vibration mount 21 is located on the rear portion of the main body 17*a* of the muffler 17 and on the lower portion of the main body 17*a* of the muffler 17, and the second anti-vibration mount 22 is located on the front portion of the main body 17*a* of the muffler 17 and on the upper portion of the main body 17*a* of the muffler 17.

A configuration may be adopted in which the first anti-vibration mount 21 is located on the rear portion of the main body 17*a* of the muffler 17 and on the upper portion of the main body 17*a* of the muffler 17, and the second anti-vibration mount 22 is located on the front portion of the main body 17*a* of the muffler 17 and on the lower portion of the main body 17*a* of the muffler 17.

Third Variation for Carrying Out the Invention

A configuration may be adopted in which, in the first anti-vibration mount 21, the support member 25 extends from the base 24 toward the rear face section 17*c* of the muffler 17 along the longitudinal direction A1 of the muffler 17, and, in the second anti-vibration mount 22, the support member 25 extends from the base 24 toward the front face section 17*b* of the muffler 17 along the longitudinal direction A1 of the muffler 17.

With the above configuration, in the first anti-vibration mount 21, the support member 25 is inserted into the opening 23*a* of the anti-vibration rubber 23 from the front of the anti-vibration rubber 23 and projects rearward from the opening 23*a* of the anti-vibration rubber 23. In the second anti-vibration mount 22, the support member 25 is inserted into the opening 23*a* of the anti-vibration rubber 23 from the rear of the anti-vibration rubber 23 and projects forward from the opening 23*a* of the anti-vibration rubber 23.

Fourth Variation for Carrying Out the Invention

A configuration may be adopted in which, in both of the first and second anti-vibration mounts 21 and 22, the support member 25 extends from the base 24 toward the front face section 17*b* of the muffler 17 along the longitudinal direction A1 of the muffler 17.

With the above configuration, in both of the first and second anti-vibration mounts 21 and 22, the support member 25 is inserted into the opening 23*a* of the anti-vibration rubber 23 from the rear of the anti-vibration rubber 23 and projects forward from the opening 23*a* of the anti-vibration rubber 23.

Fifth Variation for Carrying Out the Invention

A configuration may be adopted in which, in both of the first and second anti-vibration mounts 21 and 22, the support member 25 extends from the base 24 toward the rear face section 17*c* of the muffler 17 along the longitudinal direction A1 of the muffler 17.

With the above configuration, in both of the first and second anti-vibration mounts 21 and 22, the support member 25 is inserted into the opening 23*a* of the anti-vibration rubber 23 from the front of the anti-vibration rubber 23 and projects rearward from the opening 23*a* of the anti-vibration rubber 23.

Sixth Variation for Carrying Out the Invention

A configuration may be adopted in which, when viewed in the longitudinal direction A1 of the muffler 17, the first anti-vibration mount 21 is located at the position of the vertical line B1, the second anti-vibration mount 22 is located to the left (on the side that is far from the attachment target) of the vertical line B1, and the inlet pipe 17*d* of the muffler 17 (the spherical joint 16 and the exhaust pipe 15) is located to the right (on the side that is near the attachment target) of the vertical line B1.

A configuration may be adopted in which, when viewed in the longitudinal direction A1 of the muffler 17, the second anti-vibration mount 22 is located at the position of the vertical line B1, the first anti-vibration mount 21 is located to the right (on the side that is near the attachment target) of the vertical line B1, and the inlet pipe 17*d* of the muffler 17 (the spherical joint 16 and the exhaust pipe 15) is located to the left (on the side that is far from the attachment target) of the vertical line B1.

A configuration may be adopted in which, when viewed in the longitudinal direction A1 of the muffler 17, the second anti-vibration mount 22 is located at the position of the vertical line B1, the first anti-vibration mount 21 is located to the left (on the side that is far from the attachment target) of the vertical line B1, and the inlet pipe 17*d* of the muffler 17 (the spherical joint 16 and the exhaust pipe 15) is located to the right (on the side that is near the attachment target) of the vertical line B1.

A configuration may be adopted in which, when viewed in the longitudinal direction A1 of the muffler 17, the inlet pipe 17*d* of the muffler 17 (the spherical joint 16 and the exhaust pipe 15) is located at the position of the vertical line B1, the first anti-vibration mount 21 is located to the right (on the side that is near the attachment target) of the vertical line B1, and the second anti-vibration mount 22 is located to the left (on the side that is far from the attachment target) of the vertical line B1.

A configuration may be adopted in which, when viewed in the longitudinal direction A1 of the muffler 17, the inlet pipe 17*d* of the muffler 17 (the spherical joint 16 and the exhaust pipe 15) is located at the position of the vertical line B1, the first anti-vibration mount 21 is located to the left (on the side that is far from the attachment target) of the vertical line B1, and the second anti-vibration mount 22 is located to the right (on the side that is near the attachment target) of the vertical line B1.

Seventh Variation for Carrying Out the Invention

A configuration may be adopted in which, in the first and second anti-vibration mounts 21 and 22, the openings 23*a* of the anti-vibration rubbers 23 and the support members 25 are oriented in a direction (left-right direction) that is orthogonal to the longitudinal direction A1 of the muffler 17.

Eighth Variation for Carrying Out the Invention

A configuration may be adopted in which the muffler 17 is located to the right of the transmission case 14 and extends along a right lateral surface of the transmission case 14.

With this configuration, the longitudinal direction A1 of the muffler 17 extends along the front-rear direction and the right lateral surface of the transmission case 14.

Ninth Variation for Carrying Out the Invention

The muffler 17 may be located with the longitudinal direction A1 of the muffler 17 aligned with the left-right direction (the direction extending along a horizontal plane).

A configuration may be adopted in which, in one or both of the first and second anti-vibration mounts 21 and 22, the bracket 26 is attached to the muffler 17, and the anti-vibration rubber 23 is attached to the bracket 26 by the attachment member 27. With this configuration, the base 24 and the support member 25 are attached to the transmission case 14.

Tenth Variation for Carrying Out the Invention

A configuration may be adopted in which the engine 12 is configured as a longitudinally mounted type with the crankshaft (not shown) oriented in the front-rear direction, and the belt-driven type continuously variable transmission 13 is replaced with a hydrostatic continuously variable transmission 13.

In the above configuration, a configuration may further be adopted in which one of the first and second anti-vibration mounts 21 and 22 is attached to the transmission case 14, and the other one of the first and second anti-vibration mounts 21 and 22 is attached to the continuously variable transmission 13 (corresponding to the attachment target).

Instead of the transmission case 14, the engine 12, a frame (not shown) included in the body 3, or the like may be set as the attachment target.

INDUSTRIAL APPLICABILITY

The present invention is applicable not only to a work vehicle with an engine, but also to a hybrid work vehicle with an engine and a motor for travel.

LIST OF REFERENCE SIGNS

12 Engine
14 Transmission case (Attachment target)
15 Exhaust pipe
16 Spherical joint
17 Muffler
19 Bolt
21 First anti-vibration mount
22 Second anti-vibration mount
23 Anti-vibration rubber
23*a* Opening
24 Base
24*a* Leg portion
24*b* Recess
24*c* Opening
25 Support member
26 Bracket
26*a* Protrusion
26*b* Recess (Laterally adjacent portion)
26*c* Opening
27 Attachment member
27*a* Connecting portion
27*b* Engagement portion
A1 Longitudinal direction
A2 Up-down direction
B1 Vertical line

What is claimed is:

1. A work vehicle comprising:

an engine;

an exhaust pipe extending from the engine;

a muffler to which the exhaust pipe is connected; and a first anti-vibration mount and a second anti-vibration mount with which the muffler is attached to an attachment target while the muffler is oriented with a longitudinal direction of the muffler extending along a horizontal plane, wherein the first anti-vibration mount is located on a portion of the muffler on one side of the muffler in the longitudinal direction and on a portion of the muffler on one side of the muffler in an up-down direction, wherein the second anti-vibration mount is located on a portion of the muffler on another side of the muffler in the longitudinal direction and on a portion of the muffler on another side of the muffler in the up-down direction, wherein the exhaust pipe is connected to the portion of the muffler on the one side of the muffler in the longitudinal direction and to the portion of the muffler on the one side of the muffler in the up-down direction, wherein, when viewed in the longitudinal direction of the muffler, a connecting portion between the exhaust pipe and the muffler, the first anti-vibration mount, and the second anti-vibration mount are located at three positions, with one at each of the three positions, the three positions comprising a position of an imaginary vertical line passing through a center of the muffler when viewed in the longitudinal direction of the muffler, and positions on one side and another side, respectively, relative to the vertical line, in a direction extending along a horizontal plane, wherein the exhaust pipe is connected to the portion of the muffler on the one side of the muffler in the longitudinal direction and to the portion of the muffler on the one side of the muffler in the up-down direction, wherein, when viewed in the longitudinal direction of the muffler, the connecting portion between the exhaust pipe and the muffler is located on the one side relative to the vertical line in the direction extending along a horizontal plane, wherein, when viewed in the longitudinal direction of the muffler, the first anti-vibration mount is located at the position of the vertical line, and wherein, when viewed in the longitudinal direction of the muffler, the second anti-vibration mount is located on the other side relative to the vertical line in the direction extending along a horizontal plane.

2. The work vehicle according to claim 1, wherein:

the muffler is positioned laterally to the attachment target while the muffler is oriented with the longitudinal direction of the muffler extending along the attachment target, when viewed in the longitudinal direction of the muffler, the connecting portion between the exhaust pipe and the muffler is located on a side that is far from the attachment target, relative to the vertical line, in the direction extending along a horizontal plane, when viewed in the longitudinal direction of the muffler, one of the first anti-vibration mount and the second anti-vibration mount is located at the position of the vertical line, and when viewed in the longitudinal direction of the muffler, the other one of the first anti-vibration mount and the second anti-vibration mount is located on a side that is near the attachment target, relative to the vertical line, in the direction extending along a horizontal plane.

3. The work vehicle according to claim 1, comprising a spherical joint connecting the exhaust pipe and the muffler to each other.

4. The work vehicle according to claim 1, wherein the first anti-vibration mount and the second anti-vibration mount each comprise an anti-vibration rubber that is located on one of the muffler and the attachment target and has an opening, a base located on the other one of the muffler and the attachment target, and a support member located on the base, and wherein the opening of the anti-vibration rubber and the support member are oriented in an identical direction, and the support member is in the opening of the anti-vibration rubber.

5. The work vehicle according to claim 4, wherein the opening of the anti-vibration rubber and the support member are oriented in the longitudinal direction of the muffler.

6. The work vehicle according to claim 4, wherein the anti-vibration rubber is located on the attachment target, and wherein the base is located on the muffler.

7. The work vehicle according to claim 4, wherein the support member of the first anti-vibration mount and the support member of the second anti-vibration mount extend in opposite directions to each other from the respective bases, and wherein when the support members are in the openings of the anti-vibration rubbers, the base of the first anti-vibration mount and the base of the second anti-vibration mount are positioned on opposite sides relative to the anti-vibration rubbers.

8. The work vehicle according to claim 4, wherein the base has a pair of leg portions attached to the other one of the muffler and the attachment target, and a recess located between respective ends, opposite to the other one of the muffler and the attachment target, of the pair of leg portions and bent toward the other one of the muffler and the attachment target, and wherein the support member is attached to the recess.

9. The work vehicle according to claim 8, wherein the leg portions each have an opening.

10. The work vehicle according to claim 4, comprising:

a bracket attached to the one of the muffler and the attachment target; and an attachment member configured to press the anti-vibration rubber against the bracket to attach the anti-vibration rubber to the bracket, and wherein the attachment member has an engagement portion located at one end of the attachment member and configured to engage with the bracket, and a joining portion located at another end of the attachment member and configured to be joined to the bracket with a bolt.

11. The work vehicle according to claim 10, wherein the bracket has an opening, wherein a pair of protrusions are located at one end and another end of the opening of the bracket and protrude toward a center of the opening of the bracket, and wherein the anti-vibration rubber rests on the protrusions and is attached to the bracket by being pressed against the bracket by the attachment member.

12. The work vehicle according to claim 11, wherein the attachment member has a pair of the engagement portions, wherein one of the engagement portions is configured to engage with one of laterally adjacent portions of one of the protrusions of the opening of the bracket, and wherein the other one of the engagement portions is configured to engage with the other one of the laterally adjacent portions of the protrusion of the opening of the bracket.

* * * * *